United States Patent
Chuang et al.

(10) Patent No.: US 9,860,548 B2
(45) Date of Patent: Jan. 2, 2018

(54) METHOD AND APPARATUS FOR PALETTE TABLE PREDICTION AND SIGNALING

(71) Applicant: HFI Innovation Inc., Zhubei City, Hsinchu County (TW)

(72) Inventors: Tzu-Der Chuang, Zhubei (TW); Yu-Chen Sun, Keelung (TW)

(73) Assignee: HFI INNOVATION INC., Zhubei, Hsinchu County (TW)

(*) Notice: Subject to any disclaimer, the term of this patent is extended or adjusted under 35 U.S.C. 154(b) by 0 days.

(21) Appl. No.: 15/312,387

(22) PCT Filed: May 22, 2015

(86) PCT No.: PCT/CN2015/079566
§ 371 (c)(1),
(2) Date: Nov. 18, 2016

(87) PCT Pub. No.: WO2015/176683
PCT Pub. Date: Nov. 26, 2015

(65) Prior Publication Data
US 2017/0111651 A1    Apr. 20, 2017

Related U.S. Application Data

(60) Provisional application No. 62/040,020, filed on Aug. 21, 2014, provisional application No. 62/002,221, filed on May 23, 2014.

(51) Int. Cl.
*H04N 19/463* (2014.01)
*H04N 19/593* (2014.01)
(Continued)

(52) U.S. Cl.
CPC ......... *H04N 19/463* (2014.11); *H04N 19/172* (2014.11); *H04N 19/593* (2014.11); *H04N 19/93* (2014.11)

(58) Field of Classification Search
CPC .................................................... H04N 19/463
(Continued)

(56) References Cited

U.S. PATENT DOCUMENTS

2013/0188710 A1* 7/2013 Xu ..................... H04N 19/159
                                                  375/240.13

FOREIGN PATENT DOCUMENTS

CN       102447907       5/2012
CN       102740078       10/2012
(Continued)

OTHER PUBLICATIONS

International Search Report dated Jul. 28, 2015, issued in application No. PCT/CN2015/079566.
(Continued)

*Primary Examiner* — Dave Czekaj
*Assistant Examiner* — Shanika Brumfield
(74) *Attorney, Agent, or Firm* — McClure, Qualey & Rodack, LLP

(57) ABSTRACT

A method and apparatus for predictive palette coding of image and video data are disclosed. Reuse flags are used to indicate whether individual palette values in the current palette table are used in the palette predictor table. The present invention applies run-length coding to the run-lengths to improve coding efficiency. According to one embodiment, a reuse flag is assigned a first value if a corresponding current palette value in the current palette table is not used in the palette predictor table, and the reuse flag is assigned a second value if the corresponding current palette value in the current palette table is used in the palette predictor table. For example, the first value corresponds to "0" and the second value corresponds to "1". The run-lengths correspond to the number of consecutive reuse flags having the first value.

29 Claims, 5 Drawing Sheets

| Palette Predictor Index | 0 | 1 | 2 | 3 | 4 | 5 | 6 | 7 | 8 | 9 | 10 | 11 |
|---|---|---|---|---|---|---|---|---|---|---|---|---|
| Reuse Flag | 1 | 0 | 1 | 1 | 0 | 1 | 0 | 0 | 1 | 0 | 0 | 0 |
| Zero-Runs | | 0 | | 1 | | 0 | | 1 | | 2 | | 3 |
| Codeword in EG-0 | 1 | 010 | | 1 | | 010 | | 011 | | | | 00100 |

(51) Int. Cl.
*H04N 19/93* (2014.01)
*H04N 19/172* (2014.01)

(58) Field of Classification Search
USPC .......................................... 375/240.02–240.2
See application file for complete search history.

(56) References Cited

FOREIGN PATENT DOCUMENTS

| | | |
|---|---|---|
| CN | 103297781 | 9/2013 |
| CN | 103763570 | 4/2014 |

OTHER PUBLICATIONS

Seregin, V., et al.; "Non-SCCE3: Run-length coding for palette predictor;" Joint Collaborative Team on Video Coding (JCT-VC) of ITU-T SG 16 WP 3 and ISO/IEC JTC 1/SC 29/WG 11; Jun.-Jul. 2014; pp. 1-3.

Huang, Y.W., et al.; "Description of Core Experiment 6 (CE6): Palette Mode Improvement;" Joint Collaborative Team on Video Coding (JCT-VC) of ITU-T SG 16 WP 3 and ISO/IEC JTC 1/SC 29/WG 11; Jun.-Jul. 2014; pp. 1-6.

Gisquet; C., et al.; "AhG10: Palette predictor stuffing;" Joint Collaborative Team on Video Coding (JCT-VC) of ITU-T SG 16 WP 3 and ISO/IEC JTC 1/SC 29/WG 11; Mar.-Apr. 2014; pp. 1-3.

\* cited by examiner

| Palette Predictor Index | 0 | 1 | 2 | 3 | 4 | 5 | 6 | 7 | 8 | 9 | 10 | 11 |
|---|---|---|---|---|---|---|---|---|---|---|---|---|
| Reuse Flag | 1 | 0 | 1 | 1 | 0 | 1 | 0 | 0 | 1 | 0 | 0 | 0 |
| Zero-Runs | 0 | | 1 | 0 | | 1 | | | 2 | | | 3 |
| Codeword in EG-0 | 1 | | 010 | 1 | | 010 | | | 011 | | | 00100 |

Fig. 1

| Palette Predictor Index | 0 | 1 | 2 | 3 | 4 | 5 | 6 | 7 | 8 | 9 | 10 | 11 |
|---|---|---|---|---|---|---|---|---|---|---|---|---|
| Reuse Flag | 1 | 0 | 1 | 1 | 0 | 1 | 0 | 0 | 1 | 0 | 0 | 0 |
| Zero-Runs | 0 | | 1 | 0 | | 1 | | | 2 | | | last |

Fig. 2

| Palette Predictor Index | 0 | 1 | 2 | 3 | 4 | 5 | 6 | 7 | 8 | 9 | 10 | 11 |
|---|---|---|---|---|---|---|---|---|---|---|---|---|
| Reuse Flag | 1 | 0 | 1 | 1 | 0 | 1 | 0 | 0 | 1 | 0 | 0 | 0 |
| Zero-Runs | 0 | | 1 | 0 | | 1 | | | 2 | | | Last |
| Modified Zero-Runs | 0 | | 2 | 0 | | 2 | | | 3 | | | 1 |

Fig. 3

| Palette Predictor Index | 0 | 1 | 2 | 3 | 4 | 5 | 6 | 7 | 8 | 9 | 10 | 11 |
|---|---|---|---|---|---|---|---|---|---|---|---|---|
| Reuse Flag | 1 | 0 | 1 | 1 | 0 | 1 | 0 | 0 | 1 | 0 | 0 | 0 |

Zero-Runs          0     1     0     1         2            last
End-Code           3     3     3     3         1            1
Modified
Zero-Runs          0     1     0     1         3            1

Fig. 4

| Palette Predictor Index | 0 | 1 | 2 | 3 | 4 | 5 | 6 | 7 | 8 | 9 | 10 | 11 |
|---|---|---|---|---|---|---|---|---|---|---|---|---|
| Reuse Flag | 1 | 0 | 1 | 1 | 0 | 1 | 0 | 0 | 1 | 0 | 0 | 0 |

Zero-Runs          0     1     0     1         2            last (=k)
Binarized
codeword           1    010    1   010        011<u>0</u>         011<u>1</u>

Fig. 5

| Palette Predictor Index | 0 | 1 | 2 | 3 | 4 | 5 | 6 | 7 | 8 | 9 | 10 | 11 |
|---|---|---|---|---|---|---|---|---|---|---|---|---|
| Reuse Flag | 1 | 0 | 1 | 1 | 0 | 1 | 0 | 0 | 1 | 0 | 0 | 0 |

Zero-Runs          0     1     0     1         2
                                              num_of_reused_palette
                                              = to 5

Fig. 6

METHOD AND APPARATUS FOR PALETTE TABLE PREDICTION AND SIGNALING

CROSS REFERENCE TO RELATED APPLICATIONS

The present invention claims priority to U.S. Provisional Patent Application, Ser. No. 62/002,221, filed on May 23, 2014 and U.S. Provisional Patent Application, Ser. No. 62/040,020, filed on Aug. 21, 2014. The U.S. Provisional Patent Applications are hereby incorporated by reference in their entireties.

TECHNICAL FIELD

The present invention relates to color index coding for video data. In particular, the present invention relates to palette table coding by using palette prediction techniques.

BACKGROUND

High Efficiency Video Coding (HEVC) is a new coding standard that has been developed in recent years. In the High Efficiency Video Coding (HEVC) system, the fixed-size macroblock of H.264/AVC is replaced by a flexible block, named coding unit (CU). Pixels in the CU share the same coding parameters to improve coding efficiency. A CU may begin with a largest CU (LCU), which is also referred as coded tree unit (CTU) in HEVC. In addition to the concept of coding unit, the concept of prediction unit (PU) is also introduced in HEVC. Once the splitting of CU hierarchical tree is done, each leaf CU is further split into one or more prediction units (PUs) according to prediction type and PU partition.

Along with the High Efficiency Video Coding (HEVC) standard development, the development of extensions of HEVC has also started. The HEVC extensions include range extensions (RExt) which target at non-4:2:0 color formats, such as 4:2:2 and 4:4:4, and higher bit-depths video such as 12, 14 and 16 bits per sample. One of the likely applications utilizing RExt is screen sharing, over wired- or wireless-connection. Due to specific characteristics of screen contents, coding tools have been developed and demonstrate significant gains in coding efficiency. Among them, the color index coding (a.k.a. major color based coding) techniques represent block of pixels using indices to the palette (major colors), and encode the palette and the indices by exploiting spatial redundancy. While the total number of possible color combinations is huge, the number of colors in an area of picture is usually very limited for typical screen contents. Therefore, the color index coding becomes very effective for screen content materials.

During the early development of HEVC range extensions (RExt), several proposals have been disclosed to address palette-based coding. For example, a palette prediction and sharing technique is disclosed in JCTVC-N0247 (Guo et al., "RCE3: Results of Test 3.1 on Palette Mode for Screen Content Coding", Joint Collaborative Team on Video Coding (JCT-VC) of ITU-T SG 16 WP 3 and ISO/IEC JTC 1/SC 29/WG 11, 14th Meeting: Vienna, AT, 25 Jul.-2 Aug. 2013 Document: JCTVC-N0247) and JCTVC-O0218 (Guo et al., "Evaluation of Palette Mode Coding on HM-12.0+RExt-4.1", Joint Collaborative Team on Video Coding (JCT-VC) of ITU-T SG 16 WP 3 and ISO/IEC JTC 1/SC 29/WG 11, 15th Meeting: Geneva, CH, 23 Oct.-1, Nov. 2013, Document: JCTVC-O0218). In JCTVC-N0247, the palette of each color component is constructed and transmitted. The palette can be predicted (or shared) from its left neighboring CU to reduce the bitrate. All pixels within the given block are then coded using their palette indices. An example of encoding process according to JCTVC-N0247 is shown as follows.

1. Transmission of the palette: the color index table size is first transmitted followed by the palette elements.
2. Transmission of pixel values: the pixels in the CU are encoded in a raster scan order. For each group of one or more pixels, a flag for a run-based mode is first transmitted to indicate whether the "run" mode or "copy above" mode is being used.
   2.1 "run" mode: In the "run" mode, a palette index is first signaled followed by "palette_run" (e.g., M) representing the run value. The run value indicates that a total of M samples are all coded using "run" mode. No further information needs to be transmitted for the current position and the following M positions since they have the same palette index as that signaled in the bitstream. The palette index (e.g., i) may also be shared by all three color components, which means that the reconstructed pixel values are (Y, U, V)=(palette$_Y$[i], palette$_U$[i], palette$_V$[i]) for the case of YUV color space.
   2.2 "copy above" mode: In the "copy above" mode, a value "copy_run" (e.g., N) is transmitted to indicate that for the following N positions (including the current one), the palette index is the same as the corresponding palette index in the row above.
3. Transmission of residue: the palette indices transmitted in Stage 2 are converted back to pixel values and used as the prediction. Residue information is transmitted using HEVC residual coding and is added to the prediction for the reconstruction.

In the original version of the work disclosed in JCTVC-N0247, palette of each component are constructed and transmitted. The palette can be predicted (shared) from its left neighboring CU to reduce the bitrate. In JCTVC-O0218, each element in the palette is a triplet, representing a specific combination of the three color components. The predictive coding of palette across CU is removed.

Yet another major color-base coding (color index coding) method is disclosed by Guo et al. in JCTVC-O0182 (Guo et al., "*AHG8: Major-color-based screen content coding*", Joint Collaborative Team on Video Coding (JCT-VC) of ITU-T SG 16 WP 3 and ISO/IEC JTC 1/SC 29/WG 11, 15th Meeting: Geneva, CH, 23 Oct.-1, Nov. 2013, Document: JCTVC-O0182). According to JCTVC-O0182, the palette of each component are constructed and transmitted. However, instead of predicting the entire palette from the left CU, individual entry in a palette can be predicted from the exact corresponding palette entry in the above CU or left CU.

According to JCTVC-O0182, a predictive coding method is applied on the indices for transmission of pixel values, where a pixel line can be predicted by different modes. In specific, three kinds of line modes are used for a pixel line, i.e. horizontal mode, vertical mode and normal mode. In horizontal mode, all the pixels in the same line have the same value. If the value is the same as the first pixel of the above pixel line, only line mode signaling bits are transmitted. Otherwise, the index value is also transmitted. In vertical mode, the current pixel line is the same with the above pixel line. Therefore, only line mode signaling bits are transmitted. In normal mode, pixels in a line are predicted individually. For each pixel, the left or above neighboring pixel is used as predictor, and the prediction symbol is transmitted to the decoder. Furthermore, pixels are classified into major color pixels and escape pixels. For major color pixels, the decoder reconstructs the pixel values using the major color indices and palette. For escape pixels, the encoder will further send the pixel values.

It is desirable to develop methods for further improving the coding efficiency associated with the color index coding.

SUMMARY

A method and apparatus for predictive palette coding of image and video data are disclosed. In palette prediction, a current palette table may be predictively coded using a palette predictor table as a reference. Reuse flags are used to indicate whether individual palette values in the current palette table are used in the palette predictor table. The present invention applies run-length coding to the run-lengths of reuse flags to improve coding efficiency. According to one embodiment, a reuse flag is assigned a first value if a corresponding current palette value in the current palette table is not used in the palette predictor table, and the reuse flag is assigned a second value if the corresponding current palette value in the current palette table is used in the palette predictor table. For example, the first value corresponds to "0" and the second value corresponds to "1". The run-lengths correspond to the number of consecutive reuse flags having the first value.

In one embodiment, an end-code (EC) can be used to indicate that none of one or more remaining reuse flags after a current reuse flag has the second value. An EC code value can be assigned to the end-code and any run-length having a run-length value equal to or larger than the EC code value is increased by one to form a modified run-length. At the decoder side, if the decoded run-length has a run-length value equal to the EC code value, the parsing process of the video bitstream for the current coding unit is terminated. If the decoded run-length has a run-length value larger than the EC code value, the run-length value for the decoded run-length is decreased by one. The EC code value can be assigned to the end-code adaptively in response to information related to the current coding unit, coding parameters of the current coding unit, previously coded information, or any combination of them. For example, the EC code value can be assigned to the end-code adaptively according to the coding unit size, palette index of a previous predicted palette, or both.

The run-lengths or the modified run-length with the EC code value can be binarized using Exponential-Golomb code with order-K (EG-K code), truncated Exponential-Golomb code with order-K (truncated EG-K code), or N-bit Truncated Unary code+EG-K code. K and N can be selected from a group consisting of {0, 1, 2, 3}.

Besides using the EC, another embodiment uses an explicit ending_flag to indicate an end of the compressed data associated with the current coding unit. A run-length code value for one of the run-lengths of the reuse flags is designated as the ending_flag, and the run-length code value is selected from a group consisting of {0, 1, 2, 3, 4, 5, 6}. Similar to the EC coding, the explicit ending_flag can also be coded adaptively.

In yet another embodiment, a syntax num_of_reused_palette is signaled to indicate the number of palette values reused from a last coded palette table. The syntax num_of_reused_palette can be binarized using Exponential-Golomb code with order-K (EG-K code), truncated Exponential-Golomb code with order-K (truncated EG-K code), N-bit Truncated Unary code+EG-K code, or Truncated Unary code. K and N can be selected from a group consisting of {0, 1, 2, 3}. The syntax syntax num_of_reused_palette can be signaled before signaling the run-lengths of the reuse flags. If the number of palette values reused from the last coded palette table is zero, the run-lengths of the reuse flags need not to be signaled.

In yet another embodiment, a syntax num_of_zero_run_M can be signaled to indicate a number of M-valued run-lengths for the reuse flags of the current coding unit, or a syntax num_of_zero_run_equal_larger_M can be signaled to indicate a number of M-or-larger-valued run-lengths of the current coding unit. The M-valued run-length has a number of coded run-length values equal to M. The M-or-larger-valued run-length has a number of coded run-length values equal to or larger than M. M is an integer. The syntax num_of_zero_run_M or the syntax num_of_zero_run_equal_larger_M can be binarized using Exponential-Golomb code with order-K (EG-K code), truncated Exponential-Golomb code with order-K (truncated EG-K code), N-bit Truncated Unary code+EG-K code, or Truncated Unary code. K and N can be selected from a group consisting of {0, 1, 2, 3}. An end-code (EC) can be used to indicate that none of one or more remaining reuse flags after a current reuse flag has the second value and an EC code value equal to M can be assigned to the end-code. The syntax num_of_zero_run_M or the syntax num_of_zero_run_equal_larger_M can be decoded before the run-lengths for the current coding unit. If the number of decoded run-lengths having a run-length value equal to M is larger than the syntax num_of_zero_run_M, or if the number of the decoded run-lengths having a run-length value equal to or larger than M is larger than the syntax num_of_zero_run_equal_larger_M, the parsing process for the video bitstream for the current coding unit is terminated.

BRIEF DESCRIPTION OF DRAWINGS

FIG. 1 illustrates an example of palette prediction coding according to an embodiment of the present invention, where the run-lengths of the reuse flags having a value of 0 are used to the palette prediction.

FIG. 2 illustrates an example of palette prediction coding according to an embodiment of the present invention, where an end-code is used to indicate the last zero-run.

FIG. 3 illustrates an example of palette prediction coding according to an embodiment of the present invention, where an end-code (EC) is used to indicate the last zero-run, and run-length values for zero-runs having run-length values equal to or larger than the EC code value are increased by 1.

FIG. 4 illustrates an example of palette prediction coding according to an embodiment of the present invention, where an end-code (EC) is used to indicate the last zero-run, and the EC is adaptively coded.

FIG. 5 illustrates an example of palette prediction coding according to an embodiment of the present invention, where an explicit ending-flag is used to indicate the last zero-run.

FIG. 6 illustrates an example of palette prediction coding according to an embodiment of the present invention, where a syntax element to indicate the number of reused predicted palette entries is signaled.

DETAILED DESCRIPTION

Figure 7:
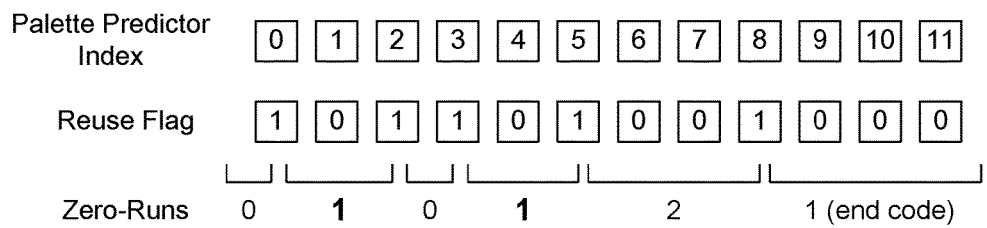
FIG. 7 illustrates an example of palette prediction coding according to an embodiment of the present invention, where a syntax element to indicate the number of zero-runs having run-length values equal to M is signaled.

Various embodiments of the present invention to improve the performance of palette prediction coding are disclosed. In palette prediction, reuse flags are used to indicate whether individual palette values in a current palette table are used in the palette predictor table. The present invention applies run-length coding to the run-lengths to improve coding efficiency.

Palette Prediction Coding

In JCTVC-O0218 and JCTVC-N0247, the palette prediction flags are used for predicting the palette from the last palette-coded coding unit (CU). One bit is used for each entry. In JCTVC-Q0063 (Gisquet et al., *AhG10: palette predictor stuffing*, Joint Collaborative Team on Video Coding (JCT-VC) of ITU-T SG 16 WP 3 and ISO/IEC JTC 1/SC 29/WG 11, 17th Meeting: Valencia, ES, 27 Mar.-4, Apr. 2014, Document: JCTVC-Q0063), an end-of-prediction flag is introduced to improve the coding efficiency.

In order to improve the performance, various binarization processes for the codeword according to an embodiment of the present invention are disclosed. The binarization process can be different (e.g., EG-K code or truncated EG-K code) for different entries. Furthermore, the palette predictors can be divided into multiple regions. For example, the palette predictors can be divided into three groups consisting of 8, 8 and 16 entries respectively. For different regions, the different coding methods are applied for coding the palette prediction flags.

In the present invention, instead of using one palette prediction flag for every entry, the zero-runs between each predicted palette entry is coded to reduce transmitted data. The codeword for zero-run i means there are i zeros before the next palette reuse flag that is 1. For example, "0" means the next one palette is reused (i.e., no 0 between the current and next reuse flag 1). "1" means the second next palette is reused. An exemplary palette prediction table with 12 palettes is shown in FIG. 1. The palette entries indicated by palette predictor indices 0, 2, 3, 5, and 8 are reused by the current CU, and the corresponding reuse flags have a value of 1. The palette entries indicated by palette predictor indices 1, 4, 6, 7, 9, 10 and 11 are not reused by the current CU, and the corresponding reuse flags have a value of 0. The run-lengths (i.e., zero-runs) of the reuse flag for the predicted palette entries are {0, 1, 0, 1, 2, 3} as shown in FIG. 1.

The binarization method can be Exponential-Golomb code with order-K (EG-K code), truncated Exponential-Golomb code with order-K (truncated EG-K code), or N-bit Truncated Unary code+EG-K code. The K can be 0, 1, 2, or 3. The N can be 0, 1, 2, or 3. In FIG. 1, the binarization based on EG-0 code for the example of is shown.

In order to signal the last used palette, a method to insert an end-code (EC) into the codeword is disclosed in JCTVC-R0228 (Seregin et al., *Non-SCCE3: Run-length coding for palette predictor*, Joint Collaborative Team on Video Coding (JCT-VC) of ITU-T SG 16 WP3 and ISO/IEC JTC 1/SC29/WG11, 18th Meeting: Sapporo, JP, 30 Jun.-9 Jul. 2014, Document: JCTVC-R0228). An example of palette prediction using an end-code is shown in FIG. 2, where the trailing reuse flags having a value of 0 are represented by an end-code (i.e., "last" in FIG. 2).

According to one embodiment of the present invention, an EC code value is assigned to the end-code, and a run-lengths modification process is performed to determine whether each run-length (i.e., zero-run) of the reuse flag has to be modified. The zero-runs that are equal to or larger than the EC code value will be modified by increasing the respective run-length values by 1. In the decoder side, if the decoded zero-run has a run-length value equal to the EC code value, it implies that it is the end of coded data for the current CU and there is no other predicted palette data for the current CU. If the decoded zero-run has a run-length value larger than the EC code value, it implies that the decoded zero-run is a modified zero-run and the actual run-length value should be the decoded run-length value decrease by 1.

For example, the EC code value can be assigned to 1. Then the run-lengths with the inserted end-code for the example of FIG. 2 have to be modified as {0, 2, 0, 2, 3, 1} as shown in FIG. 3, where each modified run-length is indicated by bold number. If the EC code value is set to 2, the run-lengths with the inserted end-code for the example of FIG. 2 have to be modified as {0, 1, 0, 1, 3, 2}. After the run-lengths modification process, each run-length (whether it has been modified or not) and the EC code value can be binarized using Exponential-Golomb code with order-K (EG-K code), truncated Exponential-Golomb code with order-K (truncated EG-K code), or N-bit Truncated Unary code+EG-K code. K and N can be selected from a group consisting of {0, 1, 2, 3}.

Another embodiment of the present invention incorporates adaptive EC coding for coding the zero-run. The EC code value can be dependent on to the information related to the current coding unit, coding parameters of the current coding unit, previously coded information, or any combination thereof. For example, the EC coding can be dependent on the CU size such that, if the CU size is equal to or small than 16, the EC code value is set to 1. Otherwise, the EC code value is set to 3. The binarization of zero-runs can be according to the EG-0 code.

The EC code value may also be dependent on the palette predictor index of previous predicted palette. In other words, the EC code value is dependent on the entry location of the previous predicted palette table. For example, if the palette predictor index of previous predicted palette is equal to or small than a threshold, the EC code value is set to one value. If the palette predictor index of previous predicted palette is greater than the threshold, the EC code value is set to another value. For example, the threshold is 16 and the EC code value is set to 3 if the palette predictor index equal to or smaller than 16. Otherwise, the EC code value is set 1. The binarization of zero-runs can be according to the EG-0 code.

In another example, the threshold of the palette predictor index of the previous predicted palette is 4. As shown in FIG. 4, the zero-runs for palette predictor indices equal to or smaller than 4 are {0, 1, 0, 1}. Since all zero-runs are smaller the EC code value (i.e., 3), there is no need to modify the zero-run. The remaining zero-runs for palette predictor indices greater than the threshold (i.e., 4) are {2, EC}. The EC code value is set to 1 in this region since palette predictor indices are greater than 4. Therefore, the zero-run with a run-length value 2 has to be increased by 1. Accordingly, the zero-runs are modified to {0, 1, 0, 1, 3, 1} as shown in FIG. 4.

In another embodiment of the present invention, coding the last predicted palette corresponds to signaling an explicit ending_flag. For example, when the coded zero-run is equal to a value K, an ending_flag is explicitly signaled. It indicates the end of predicted palette. K can be an integer such as 0, 1, 2, 3, 4, 5, or 6. For example, if K is equal to 2 and the EG-0 code is used for the binarization of zero-run, the modified set of zero-runs for the example of FIG. 1 becomes {0, 1, 0, 1, 2+(1 bit of 0), 2+(1 bit of 1)} as shown in FIG. 5. In order to differentiate the code for the zero-run with run-length equal to 2, an additional bit is appended to the end of the binary codes for the run-length with a value of 2 and the ending_flag shown as under-lined bits in FIG. 5.

The parameter K can be dependent on CU size. For example, if the CU size is equal to or small than 16, K can be 2. Otherwise, K can be 6. The binarization of zero-runs can be according to EG-0 code.

The parameter K can also be dependent on the index of previous predicted palette. For example, if the palette predictor index of previous predicted palette is equal to or small than 16, K is set to 2. Otherwise, K is set to 6. The binarization of zero-runs can be according to EG-0 code.

In yet another embodiment, coding the last predicted palette entry corresponds to signaling a syntax element, num_of_reused_palette to indicate the number of palette entries reused from the last coded palette table. The binarization of num_of_reused_palette can be Exponential-Golomb code with order-K (EG-K code), truncated Exponential-Golomb code with order-K (truncated EG-K code), N-bit Truncated Unary code+EG-K code, or Truncated Unary code, where K can be 0, 1, 2, or 3 and N can be 0, 1, 2, or 3.

An example is shown in FIG. 6, there are 5 predicted palette entries are reused from the last coded palette table. A syntax num_of_reused_palette equal to 5 is signaled to indicate the number of predicted palette entries. Then, the zero-runs corresponding to {0, 1, 0, 1, 2} are signaled after the syntax num_of_reused_palette. If the num_of_reused_palette is equal to 0, there is no need to signal the zero-runs.

In another embodiment, coding the last predicted palette entry corresponds to signaling a syntax num_of_zero_run_M corresponding to the number of zero-runs having run-length values equal to M. M can be an integer such as 0, 1, 2, 3, or 6. The binarization of num_of_zero_run_M can be Exponential-Golomb code with order-K (EG-K code), truncated Exponential-Golomb code with order-K (truncated EG-K code), N-bit Truncated Unary code+EG-K code, or Truncated Unary code, where K can be 0, 1, 2, or 3 and N can be 0, 1, 2, or 3. The end code for zero-runs is equal to M.

An example of using the syntax num_of_zero_run_M mentioned above is shown in FIG. 7, where M is equal to 1 and there are two zero-runs (indicated by bold numbers) equal to 1. Accordingly, num_of_zero_run_M equal to 2 is coded first. Then, the zero-runs corresponding to {0, 1, 0, 1, 2, 1} are signaled. The last codeword "1" is the end code.

In the decoder side, the num_of_zero_run_M is decoded first and then the zero-runs are decoded. If the number of decoded zero-run having a run-length value M is larger than num_of_zero_run_M, the parsing procedure is terminated. For example, if the num_of_zero_run_M is equal to 2 and M is equal to 1, when the third zero-runs equal to M is decoded, it indicates that it is the end code. Therefore, the parsing of palette prediction is terminated.

In yet another embodiment, coding the last predicted palette entry corresponds to signaling a syntax num_of_zero_run_equal_larger_M corresponding to the number of zero-runs equal to or larger than M, where M is an integer such as 0, 1, 2, 3, or 6. The binarization of num_of_zero_run_equal_larger_M can be Exponential-Golomb code with order-K (EG-K code), truncated Exponential-Golomb code with order-K (truncated EG-K code), N-bit Truncated Unary code+EG-K code, or Truncated Unary code, where K can be 0, 1, 2, or 3 and N can be 0, 1, 2, or 3. The end code for zero-runs is equal to M.

Figure 8:
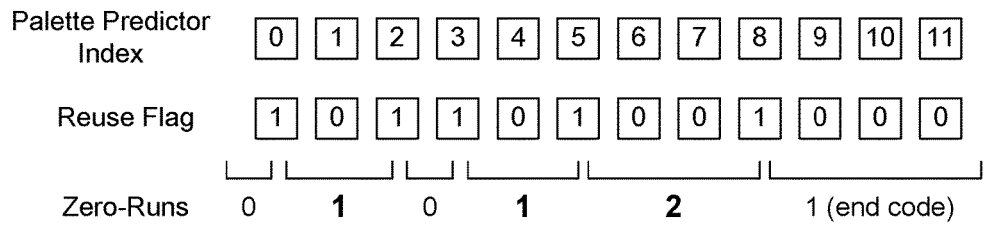
FIG. 8 illustrates an example of palette prediction coding according to an embodiment of the present invention, where a syntax element to indicate the number of zero-runs having run-length values equal to or larger than M is signaled.

An example of using the syntax num_of_zero_run_equal_larger_M mentioned above is shown in FIG. 8, where the M is 1 and there are three zero-runs (indicated by bold numbers) that equal to or larger than 1. The syntax num_of_zero_run_equal_larger_M equal to 3 is signaled first. Then, the zero-runs corresponding to {0, 1, 0, 1, 2, 1} are signaled. The last codeword "1" is the end code.

In the decoder side, the num_of_zero_run_equal_larger_M is decoded first, and then the zero-runs are decoded. The decoder will count the number of zero-runs that are equal to or larger than M. If the number of decoded zero-runs value that is equal to or larger than M is larger than num_of_zero_run_equal_larger_M, the parsing procedure is terminated. For example, if the num_of_zero_run_equal_larger_M is equal to 3 and when the fourth decoded zero-runs is equal to or larger than 1, it indicates the end code. The parsing of palette prediction is terminated.

Other aspects related to palette prediction coding are also disclosed in this application.

Region Base BWT for Index Map

After quantizing the sample values into major colors, the index map can be processed by one or more selected transforms. The CU can be divided into multiple regions (e.g., lines), and the sample indices in each region can be reordered by a predefined method or processed by a transform. For example, the transform can be the Burrows-Wheeler transform (BWT), which is known in the art for data compression. For example, at the encoder side, a CU can be divided into multiple lines. The indices in each line can be reordered by a forward BWT. The reordered indices can be processed by original index map coding. At the decoder side, the indices are first decoded and reconstructed. Then the reconstructed indices are reordered by a backward BWT to get the final sample indices.

Region Base Run Coding for Index Map

The index map of a CU can be divided into multiple regions (e.g., lines). Within each region, the run base coding as described in JCTVC-O0218 can be applied. Since the number of samples in each region is limited, the maximum number of runs can be determined. The codeword for the run can use truncated codeword such as truncated binary, truncated unary, and truncated EG codes. According to the maximum number of runs, the bins of the run codeword can be skipped if the bins can be inferred.

Escape Flag After Prediction Mode

In JCTVC-O0218, the escape sample index is signaled by an explicit escape flag. The escape flag is signaled before the prediction mode (i.e., run mode or copy above mode) syntax. An embodiment of the present invention relocates this flag to a location after the prediction mode syntax. Accordingly, the escape flag is signaled only when the prediction mode is a run mode.

Run Before Prediction Mode

In JCTVC-O0218, a run codeword is signaled after prediction mode. However, the probability of prediction mode may depend on the palette run value. Therefore, an embodiment according to the present invention signals the run codeword before the prediction mode.

Run Short Cut

As an alternative to the run base index map coding described in JCTVC-O0218, some short cuts for the palette run codeword are disclosed according to an embodiment of the present invention. In one embodiment, in palette index map coding, a short cut of run equals to CU width can be added. A syntax element for a number of lines can be added after this run short cut to indicate the number of lines using the same prediction mode. Another short cut corresponds to the run number being equal to the number of samples to end of the line.

In another example of short cut, when the current position plus run is larger than (or equal to) current line width, an addition syntax is signaled to indicate the number of lines using the same prediction mode. In yet another example of run short cut, when the run is larger than (or equal to) the line width, an addition syntax is signaled to indicate the number of lines are using the same prediction mode.

Index Minus 1 for Horizontal Mode

In line-sample-based index map coding as described in JCTVC-N0247, the horizontal line mode is used to indicate that all samples in a line shares the same index. An index is signaled for the horizontal line mode. However, in horizontal line mode, the index cannot be escape index. Therefore, according to an embodiment of the present invention, the escape index is removed from the index coding. The number of indices for signaling can be reduced by one.

Context Formation for Palette Mode Flags

In palette mode coding, there are several flags used to indicate different modes or configurations. For example, the palette_mode_flag is used to indicate whether the CU is using palette mode; palette_scan_flag is used to indicate whether the index scan is vertical scan or horizontal scan; and palette_share_flag is used to indicate whether all the last coded palette entries are reused for the current CU. For these flags, the context formation can use either only one context without any neighboring information or use multiple contexts with neighboring information. For example, the palette_mode_flag can use two contexts. The context index depends on whether the left CU is coded in the palette mode.

The context formation of these flags can depend on the current CU information, such as the CU depth. For example, the context index can be max(2, CU_depth) or max(2, max_CU_depth−CU_depth).

Context Coded Bin for the First Bin of Truncated Binary (TB) Code

The truncated binary can be used for the color index value (the sample value) and color index coding. According to an embodiment of the present invention, context coding is applied to the first bin (i.e., most significant bin (MSB bin)) of the color index value and/or color index.

Quarter-TB Code

Another embodiment of the present invention uses quarter truncated binary binarization method for color index value and color index coding. For example, the indices can be divided into three regions. The first region contains indices in $[0, (N\!>\!>\!2)-1]$, where N is the total number of indices and ">>" represents the right shift operation. The size of first region is $N\!>\!>\!2$. The codeword of the indices in the first region is "1"+TB(index, $N\!>\!>\!2$), where TB(x,y) is the binarization result according to truncated binary binarization with the input equal to x and size equal to y.

The second region contains indices in $[(N\!>\!>\!2), (N\!>\!>\!1)-1]$. The size of second region is $(N\!>\!>\!1)-(N\!>\!>\!2)$. The codeword of the indices in the second region is "01"+TB(index−(N>>2), (N>>1)−(N>>2)).

The third region contains indices in $[(N\!>\!>\!1), N-1]$. The size of third region is $N-(N\!>\!>\!1)$. The codeword of the indices in the third region is "00"+TB(index−(N>>1), N−(N>>1)).

Codeword Selection

In yet another embodiment for color index value and/or color index coding, multiple binarization methods are used. A codeword_mode syntax can be signaled to indicate binarization method for the color index value and/or color index coding.

Figure 9:
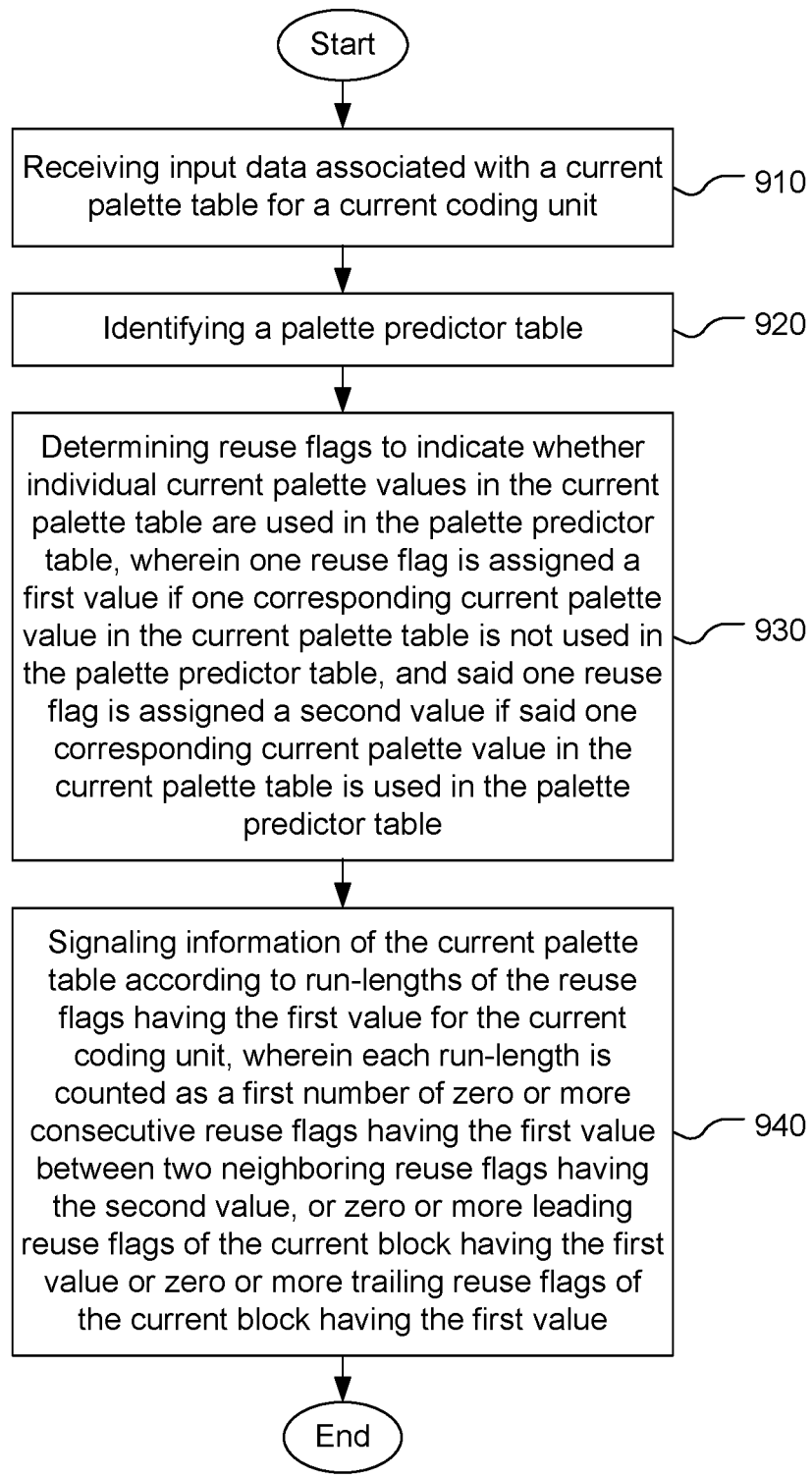
FIG. 9 illustrates an exemplary flowchart of a video coding system incorporating palette prediction according to an embodiment of the present invention.

FIG. 9 illustrates an exemplary flowchart of a video coding system incorporating palette prediction according to an embodiment of the present invention. The system receives input data associated with a current palette table for a current coding unit as shown in step 910. The input data may be retrieved from memory (e.g., computer memory, buffer (RAM or DRAM) or other media) or from a processor. A palette predictor table is identified in step 920. Reuse flags to indicate whether individual current palette values in the current palette table are used in the palette predictor table are determined in step 930. A reuse flag is assigned a first value if a corresponding current palette value in the current palette table is not used in the palette predictor table. The reuse flag is assigned a second value if the corresponding current palette value in the current palette table is used in the palette predictor table. The information of the current palette table is signaled according to run-lengths of the reuse flags having the first value for the current coding unit in step 940. Each run-length is counted as a number of zero or more consecutive reuse flags having the first value between two neighboring reuse flags having the second value, or zero or more leading reuse flags of the current block having the first value or zero or more trailing reuse flags of the current block having the first value.

Figure 10:
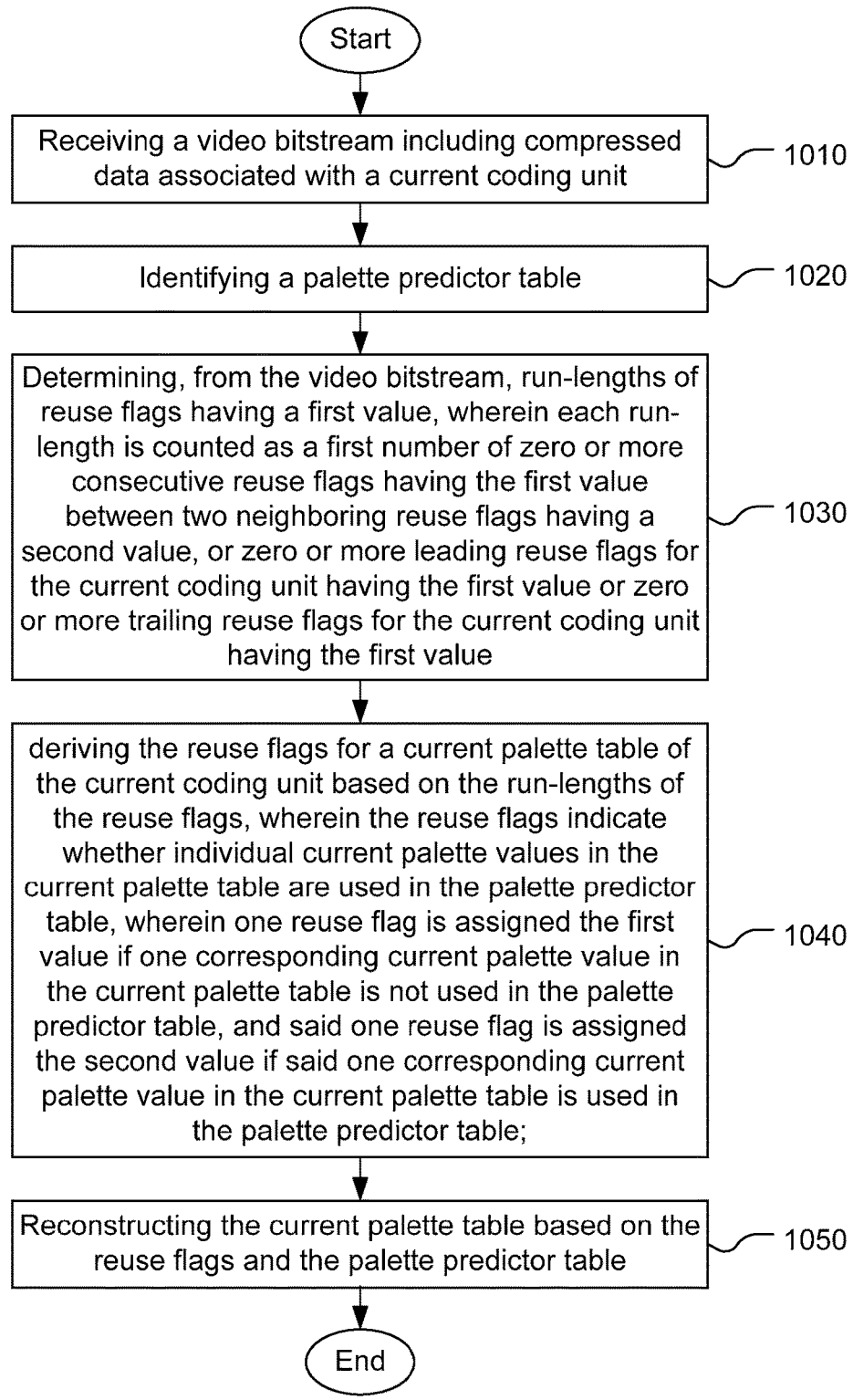
FIG. 10 illustrates an exemplary flowchart of a video decoding system incorporating palette prediction according to an embodiment of the present invention.

FIG. 10 illustrates an exemplary flowchart of a video decoding system incorporating palette prediction according to an embodiment of the present invention. The system receives a video bitstream including compressed data associated with a current coding unit as shown in step 1010. The video bitstream may be retrieved from memory (e.g., computer memory, buffer (RAM or DRAM) or other media) or from a processor. A palette predictor table is identified in step 1020. Run-lengths of reuse flags having a first value are determined from the video bitstream in step 1030, where each run-length is counted as a first number of zero or more consecutive reuse flags having the first value between two neighboring reuse flags having a second value, or zero or more leading reuse flags for the current coding unit having the first value or zero or more trailing reuse flags for the current coding unit having the first value. The reuse flags for a current palette table of the current coding unit are determined based on the run-lengths of the reuse flags in step 1040, where the reuse flags indicate whether individual current palette values in the current palette table are used in the palette predictor table. A reuse flag is assigned the first value if one corresponding current palette value in the current palette table is not used in the palette predictor table, the reuse flag is assigned the second value if the corresponding current palette value in the current palette table is used in the palette predictor table. The current palette table is then reconstructed based on the reuse flags and the palette predictor table in step 1050.

The flowcharts shown are intended to illustrate an example of palette prediction coding according to the present invention. A person skilled in the art may modify each step, re-arranges the steps, split a step, or combine steps to practice the present invention without departing from the spirit of the present invention. In the disclosure, specific syntax and semantics have been used to illustrate examples to implement embodiments of the present invention. A skilled person may practice the present invention by substituting the syntax and semantics with equivalent syntax and semantics without departing from the spirit of the present invention.

The above description is presented to enable a person of ordinary skill in the art to practice the present invention as provided in the context of a particular application and its requirement. Various modifications to the described embodiments will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed. In the above detailed description, various specific details are illustrated in order to provide a thorough understanding of the present invention. Nevertheless, it will be understood by those skilled in the art that the present invention may be practiced.

Embodiment of the present invention as described above may be implemented in various hardware, software codes, or a combination of both. For example, an embodiment of the present invention can be one or more circuit circuits integrated into a video compression chip or program code integrated into video compression software to perform the processing described herein. An embodiment of the present invention may also be program code to be executed on a Digital Signal Processor (DSP) to perform the processing described herein. The invention may also involve a number of functions to be performed by a computer processor, a digital signal processor, a microprocessor, or field programmable gate array (FPGA). These processors can be configured to perform particular tasks according to the invention, by executing machine-readable software code or firmware code that defines the particular methods embodied by the invention. The software code or firmware code may be developed in different programming languages and different formats or styles. The software code may also be compiled for different target platforms. However, different code formats, styles and languages of software codes and other means of configuring code to perform the tasks in accordance with the invention will not depart from the spirit and scope of the invention.

The invention may be embodied in other specific forms without departing from its spirit or essential characteristics. The described examples are to be considered in all respects only as illustrative and not restrictive. The scope of the invention is therefore, indicated by the appended claims rather than by the foregoing description. All changes which come within the meaning and range of equivalency of the claims are to be embraced within their scope.

The invention claimed is:

1. A method of palette coding for a picture, wherein the picture is divided into multiple coding units (CU), the method comprising:
receiving input data associated with a current palette table for a current coding unit;
identifying a palette predictor table;
determining reuse flags to indicate whether individual palette values in the palette predictor table are used in the current palette table, wherein one reuse flag is assigned a first value if one corresponding palette value in the palette predictor table is not used in the current palette table, and said one reuse flag is assigned a second value if said one corresponding palette value in the palette predictor table is used in the current palette table; and
signaling information of the current palette table according to run-lengths of the reuse flags having the first value for the current coding unit, wherein each run-length is counted as a first number of zero or more consecutive reuse flags having the first value between two neighboring reuse flags having the second value, or zero or more leading reuse flags of the current block having the first value or zero or more trailing reuse flags of the current block having the first value.

2. The method of claim 1, wherein the first value corresponds to "0" and the second value corresponds to "1".

3. The method of claim 1, wherein the run-lengths are binarized using Exponential-Golomb code with order-K (EG-K code), truncated Exponential-Golomb code with order-K (truncated EG-K code), or N-bit Truncated Unary code+EG-K code.

4. The method of claim 1, wherein an end-code (EC) is used to indicate that none of one or more remaining reuse flags after a current reuse flag has the second value.

5. The method of claim 4, wherein an EC code value is assigned to the end-code and any run-length having a run-length value equal to or larger than the EC code value is increased by one to form a modified run-length.

6. The method of claim 5, wherein the EC code value is assigned to the end-code adaptively in response to a coding unit size, palette index of a previous predicted palette, or both.

7. The method of claim 5, wherein the run-lengths and the EC code value are binarized using Exponential-Golomb code with order-K (EG-K code), truncated Exponential-Golomb code with order-K (truncated EG-K code), or N-bit Truncated Unary code+EG-K code, wherein the run-lengths consist of one or more non-modified run-lengths and/or one or more modified run-lengths.

8. The method of claim 1, wherein an explicit ending_flag is used to indicate whether said signaling the information of the current palette table is complete.

9. The method of claim 1, wherein a syntax num_of_zero_run_M or a syntax num_of_zero_run_equal_larger_M is signaled to indicate a second number of M-valued run-lengths or M-or-larger-valued run-lengths for the reuse flags of the current coding unit respectively, wherein each M-valued run-length has a first run-length value equal to M or each M-or-larger-valued run-length has a second run-length value equal to or larger than M and M is an integer, and M is an integer.

10. A method of palette decoding for a picture, wherein the picture is divided into multiple coding units (CU), the method comprising:
receiving a video bitstream including compressed data associated with a current coding unit;
identifying a palette predictor table;
determining, from the video bitstream, run-lengths of reuse flags having a first value, wherein each run-length is counted as a first number of zero or more consecutive reuse flags having the first value between two neighboring reuse flags having a second value, or zero or more leading reuse flags for the current coding unit having the first value or zero or more trailing reuse flags for the current coding unit having the first value;
deriving the reuse flags for a current palette table of the current coding unit based on the run-lengths of the reuse flags, wherein the reuse flags indicate whether individual palette values in the palette predictor table are used in the current palette table, wherein one reuse flag is assigned the first value if one corresponding palette value in the palette predictor table is not used in the current palette table, and said one reuse flag is assigned the second value if said one corresponding palette value in the palette predictor table is used in the current palette table; and reconstructing the current palette table based on the reuse flags and the palette predictor table.

11. The method of claim 10, wherein the first value corresponds to "0" and the second value corresponds to "1".

12. The method of claim 10, wherein the run-lengths are binarized using Exponential-Golomb code with order-K (EG-K code), truncated Exponential-Golomb code with order-K (truncated EG-K code), or N-bit Truncated Unary code+EG-K code.

13. The method of claim 12, wherein K is selected from a first group consisting of {0, 1, 2, 3} and N is selected from a second group consisting of {0, 1, 2, 3}.

14. The method of claim 10, wherein an end-code (EC) is used to indicate that none of one or more remaining reuse flags after a current reuse flag has the second value and an EC code value is assigned to the end-code and any run-length having a run-length value equal to or larger than the EC code value is increased by one to form a modified run-length.

15. The method of claim 14, if a decoded run-length has a run-length value equal to the EC code value, parsing the video bitstream for the current coding unit is terminated.

16. The method of claim 14, if a decoded run-length has a run-length value larger than the EC code value, the run-length value for the decoded run-length is decreased by one.

17. The method of claim 14, wherein the EC code value is assigned to the end-code adaptively in response to information related to the current coding unit, coding parameters of the current coding unit, previously coded information, or any combination thereof.

18. The method of claim 17, wherein the EC code value is assigned to the end-code adaptively in response to a coding unit size, palette index of a previous predicted palette, or both.

19. The method of claim 14, wherein the run-lengths and the EC code value are binarized using Exponential-Golomb code with order-K (EG-K code), truncated Exponential-Golomb code with order-K (truncated EG-K code), or N-bit Truncated Unary code+EG-K code, wherein the run-lengths consist of one or more non-modified run-lengths and/or one or more modified run-lengths.

20. The method of claim 10, wherein an explicit ending_flag is used to indicate an end of the compressed data associated with the current coding unit.

21. The method of claim 20, wherein a run-length code value for one of the run-lengths of the reuse flags is designated as the ending_flag, and the run-length code value is selected from a group consisting of {0, 1, 2, 3, 4, 5, 6}.

22. The method of claim 10, wherein a syntax num_of_zero_run_M or a syntax num_of_zero_run_equal_larger_M is signaled to indicate a second number of M-valued run-lengths or M-or-larger-valued run-lengths for the reuse flags of the current coding unit respectively, wherein each M-valued run-length has a first run-length value equal to M or each M-or-larger-valued run-length has a second run-length value equal to or larger than M, and M is an integer.

23. The method of claim 22, wherein M is selected from a first group consisting of {0, 1, 2, 3, 6}.

24. The method of claim 22, wherein the syntax num_of_zero_run_M or the syntax num_of_zero_run_equal_larger_M is binarized using Exponential-Golomb code with order-K (EG-K code), truncated Exponential-Golomb code with order-K (truncated EG-K code), N-bit Truncated Unary code+EG-K code, or Truncated Unary code.

25. The method of claim 24, wherein K is selected from a first group consisting of {0, 1, 2, 3} and N is selected from a second group consisting of {0, 1, 2, 3}.

26. The method of claim 22, the syntax num_of_zero_run_M or the syntax num_of_zero_run_equal_larger_M is decoded before the run-lengths for the current coding unit.

27. The method of claim 22, if a third number of decoded run-lengths having a third run-length value equal to M is larger than the syntax num_of_zero_run_M, or if a fourth number of the decoded run-lengths having a fourth run-length value equal to or larger than M is larger than the syntax num_of_zero_run_equal_larger_M, parsing the video bitstream for the current coding unit is terminated.

28. An apparatus for palette encoding of a picture in a video coding system, wherein the picture is divided into multiple coding units (CU), the apparatus comprising one or more electronic circuits configured to:

receive input data associated with a current coding unit;

determine a current palette table based on pixel values of the current coding unit;

identify a palette predictor table;

determine reuse flags to indicate whether individual palette values in the palette predictor table are used in the current palette table, wherein one reuse flag is assigned a first value if one corresponding palette value in the palette predictor table is not used in the current palette table, and said one reuse flag is assigned a second value if said one corresponding palette value in the palette predictor table is used in the current palette table; and signal information of the current palette table according to run-lengths of the reuse flags having the first value for the current coding unit, wherein each run-length is counted as a first number of zero or more consecutive reuse flags having the first value between two neighboring reuse flags having the second value, or zero or more leading reuse flags of the current block having the first value or zero or more trailing reuse flags of the current block having the first value.

29. An apparatus for palette decoding of a picture, wherein the picture is divided into multiple coding units (CU), the apparatus comprising one or more electronic circuits configured to:

receive a video bitstream including compressed data associated with a current coding unit;

determine a palette predictor table;

determine, from the video bitstream, run-lengths of reuse flags having a first value, wherein each run-length is counted as a first number of zero or more consecutive reuse flags having the first value between two neighboring reuse flags having a second value, or zero or more leading reuse flags for the current coding unit having the first value or zero or more trailing reuse flags for the current coding unit having the first value;

derive the reuse flags for a current palette table of the current coding unit based on the run-lengths of the reuse flags, wherein the reuse flags indicate whether individual palette values in the palette predictor table are used in the current palette table, wherein one reuse flag is assigned the first value if one corresponding palette value in the palette predictor table is not used in the current palette table, and said one reuse flag is assigned the second value if said one corresponding palette value in the palette predictor table is used in the current palette table; and reconstruct the current palette table based on the reuse flags and the palette predictor table.

\* \* \* \* \*